(12) United States Patent
Hill et al.

(10) Patent No.: US 11,438,740 B2
(45) Date of Patent: Sep. 6, 2022

(54) APPARATUS AND METHOD TO DETECT FOUNDATION MOVEMENT

(71) Applicants: Arlon Hill, Van Alstyne, TX (US); Tony Cooper, Dallas, TX (US)

(72) Inventors: Arlon Hill, Van Alstyne, TX (US); Tony Cooper, Dallas, TX (US)

(73) Assignee: Foundation Monitoring Systems, LLC, Irving, TX (US)

( * ) Notice: Subject to any disclaimer, the term of this patent is extended or adjusted under 35 U.S.C. 154(b) by 0 days.

(21) Appl. No.: 16/425,522

(22) Filed: May 29, 2019

(65) Prior Publication Data
US 2022/0167130 A1    May 26, 2022

(51) Int. Cl.
*E02D 33/00* (2006.01)
*H04W 4/38* (2018.01)
*H04W 4/33* (2018.01)

(52) U.S. Cl.
CPC .............. *H04W 4/38* (2018.02); *E02D 33/00* (2013.01); *H04W 4/33* (2018.02)

(58) Field of Classification Search
CPC .......... H04W 4/38; H04W 4/33; E02D 33/00; E02D 35/00; E02D 35/005; G01C 9/04; G01C 9/02; G01C 5/00; G01C 15/14
See application file for complete search history.

(56) References Cited

U.S. PATENT DOCUMENTS

| | | | | |
|---|---|---|---|---|
| 5,325,702 A | * | 7/1994 | Verstraeten | G01M 7/08 73/12.09 |
| 6,142,710 A | * | 11/2000 | Holland, Jr. | E04G 23/065 405/230 |
| 7,900,406 B2 | * | 3/2011 | Wobben | E02D 27/42 248/156 |
| 9,644,365 B1 | * | 5/2017 | DeStefano | E04B 1/34336 |
| 2004/0037653 A1 | * | 2/2004 | Kelso | E02D 35/00 405/244 |
| 2013/0008038 A1 | * | 1/2013 | Nagao | G01C 15/06 33/366.11 |
| 2016/0340856 A1 | * | 11/2016 | Conner | E02D 27/34 |
| 2018/0100282 A1 | * | 4/2018 | Vuyk, Jr. | E02D 27/08 |

* cited by examiner

*Primary Examiner* — Ryan W Sherwin
(74) *Attorney, Agent, or Firm* — Ferguson Braswell Fraser Kubasta PC

(57) ABSTRACT

An apparatus for monitoring the movement of a foundation may include an elevation sensor to detect changes in elevation of the foundation and positioned on the foundation to broadcast a signal responsive to the movement of the foundation; and a receiver to receive the signal responsive to the movement of the foundation and positioned off the foundation to provide a absolute measurement of the movement of the foundation.

20 Claims, 7 Drawing Sheets

APPARATUS AND METHOD TO DETECT FOUNDATION MOVEMENT

FIELD OF THE INVENTION

The present invention relates to an apparatus and method to detect foundation movement or stability for in particular, reinforced concrete foundations like concrete pier foundations.

BACKGROUND

In the construction industry, there has been significant effort over time to reduce the impact that soil movement has on the foundation and the edifice that is constructed upon it. Even though foundations have been built for centuries, a foundation that remains flat or stable over long periods of time has been expensive to achieve and eludes most buyers. A home foundation that stays flat or stable forever has eluded many in the industry.

Technologies to repair cracked foundations are well known in the construction industry and offer varying degrees of success and economic viability. The foundation repair industry is common for having employees with little or no knowledge in the field who are conducting the evaluation of the home. There is currently no credible way to determine if a foundation built on soil which is suspected of movement has actually moved relative to its initial "as built" condition. Elevation maps taken of a building can be misleading because the soil changes seasonally and the flooring surfaces rarely remain flat over the useful life span of a building. It is difficult to be certain about the presence or absence of modifications to the structure. This results in seasonal fluctuations in foundation heave or sag that can be hard to separate from a true permanent deformation. Soils of varying properties that are native or brought in during the construction process likewise create a problem that has to be dealt with by the engineer designing the foundation, the company constructing on said soils, the developer who bought the land, the insurance company who may have an insurance policy against foundation movement, and all property owners.

Foundation inspectors and engineers use relative floor elevations to determine if a foundation is failing. This is currently done by using a digital manometer machine (a so-called computer level) that is placed in the middle of the foundation of the home/building. This is the then used as the base reference point for the foundation measurements. The digital manometer machine is then placed around the foundation, and the digital manometer machine will register the relative foundation height differences to the center reference point as a negative or positive elevation difference. Most engineers and or inspectors use a negative −1.0 inch or more from the center reference point to determine that the foundation needs piers or adjustments of existing piers if they exist.

This method, as described above of determining that a foundation is failing, is only correct approximately 30 percent of the time. Foundations that are failing almost always have seasonal cycling of the foundation elevation. If an engineer only takes one set of elevations during the wet season a foundation may be level but still unstable and in need of repair. Additionally, the relative elevations are almost always taken from the center of the foundation of the home. If the center of the foundation of the home/building is not stable or is dynamic, the unstable center of the foundation will cause all the other elevation measurements to be incorrect.

SUMMARY

The present invention positions a transmitter/receiver external to the foundation (a non-foundation location) for example on a deep driven pier to provide a stable platform in the yard or on a nearby fixed static point to be used as a frame of reference. Thus, the measurements that are received by the transmitter/receiver are independent of movement of the foundation and not biased by the movement of the foundation of the home/building. This transmitter/receiver communicates with transmitters associated with the elevation sensors on the foundation inside the home to determine the movement of the foundation from a fixed/stable reference point rather than a dynamic (moving) reference point. These transmitters/receivers can be linked to central monitoring station such as an application on a phone or a home computer and provide weekly, monthly or yearly foundation elevations and to would be able to also determine with substantially 100 percent accuracy how much, where, what and in which direction the foundation is shifting. Thus, a relative measurement between the elevation sensor and the transmitter/receiver is avoided and an absolute measurement between the elevation sensor and the transmitter/receiver is achieved.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

Figure 1:
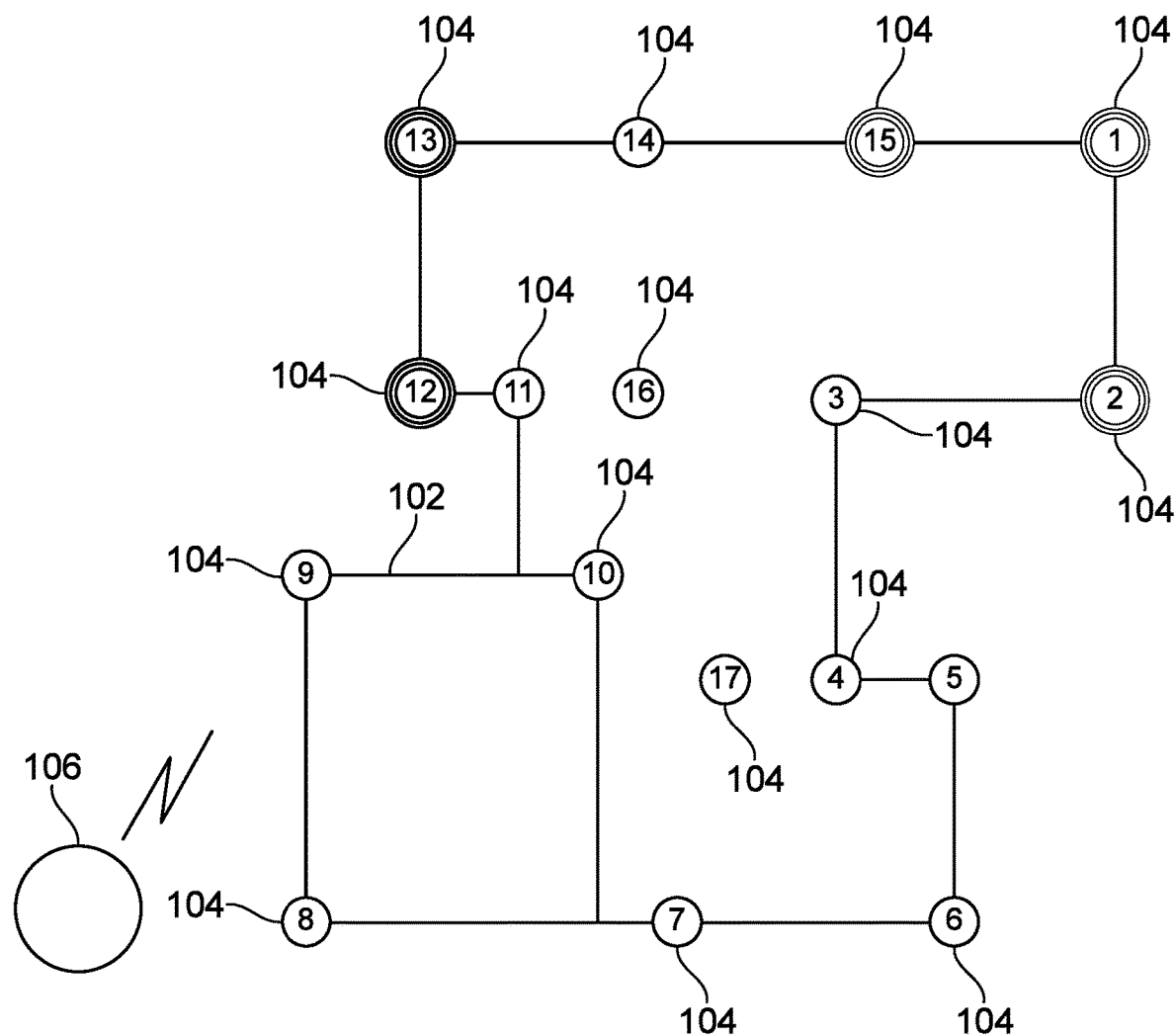
FIG. 1 illustrates a top view of a foundation with sensors mounted.

FIG. 1 illustrates a foundation 102 for a building such as a house or commercial dwelling/building. Furthermore, the foundation 102 may be for a device such as a windmill power generator. While FIG. 1 illustrates a foundation 102 which is substantially a multitude of rectangles, the foundation 102 may include curved surfaces. FIG. 1 additionally illustrates a multitude of elevation sensors 104 which can detect changes in vertical elevation from a predetermined initial position of the sensor 104 to a raised or lowered position of the elevation sensor 104 and to broadcast a signal corresponding to the change in vertical elevation to a central transmitter/receiver 106. The central transmitter/receiver 106 may be external to the foundation 102 and may be positioned at a stable location such as on a deep driven pier to provide a stable platform in the yard or on a nearby fixed static point to be used as a frame of reference The sensor 104 may be wirelessly connected to the central transmitter/receiver 106 or may be wired or otherwise connected to the central transmitter/receiver 106. The transmitter/receiver 106 is not positioned on the foundation 102 but mounted exterior to the foundation on a deep driven pier to provide a stable platform in the yard or on a nearby fixed static point to be used as a frame of reference. The transmitter/receiver 106 receives the elevation signal from the elevation sensors 104 and sends a second signal to a central monitoring station 120 where the decision may be made to correct the movement of the foundation 102.

The sensors 104 may be positioned at a multitude of positions on the foundation 102. Sensors 104 may be positioned at corners of the foundation 102 as shown as position 1, position 2, position 3, position number 4, position 5, position 6, position 8, position 9, position 10, position 11, position 12, and position 13. However, sensors 104 may be positioned along sides of the foundation as shown as position 14, position 15 and position 7. Furthermore, sensors 104 may be positioned at interior portions of the foundation as shown as position 16 and position 17.

The central transmitter/receiver 106 may be positioned/mounted on a deep driven pier to provide a stable platform in the yard or on a nearby fixed static point to be used as a frame of reference and receives the broadcast signals from the elevation sensors 104 (an example would be the use of Bluetooth or Wi-Fi or the transmitter/receiver 106 may be directly connected to a cell phone tower) which correspond to the change in elevation of each of the elevation sensors 104 and when a signal indicates that the elevation change from the elevation sensors 104 reaches a threshold predetermined value, the transmitter/receiver 106 which may be positioned on a deep driven pier to provide a stable platform in the yard or on a nearby fixed static point to be used as a frame of reference is activated and transmits a signal to a remote location such as a central station 132 to receive wireless signals from the transmitter/receiver 106 to indicate the foundation 102 has shifted and may be in danger of damage to the foundation 102. The transmitter/receiver 106 is not positioned on the foundation 102 but may be positioned external to the foundation 102 which may be on a deep driven pier to provide a stable platform in the yard or on a nearby fixed static point to be used as a frame of reference in order to eliminate (is independent from) any movement of the transmitter/receiver 106 due to the movement of the foundation 102.

Alternatively, the transmitter/receiver 106 may continuously receive signals from sensors 104 or alternatively the transmitter/receiver 106 may be activated to interrogate the sensor 104 so that the sensor 104 is activated to transmit a current elevation signal to the transmitter/receiver 106.

Figure 2:
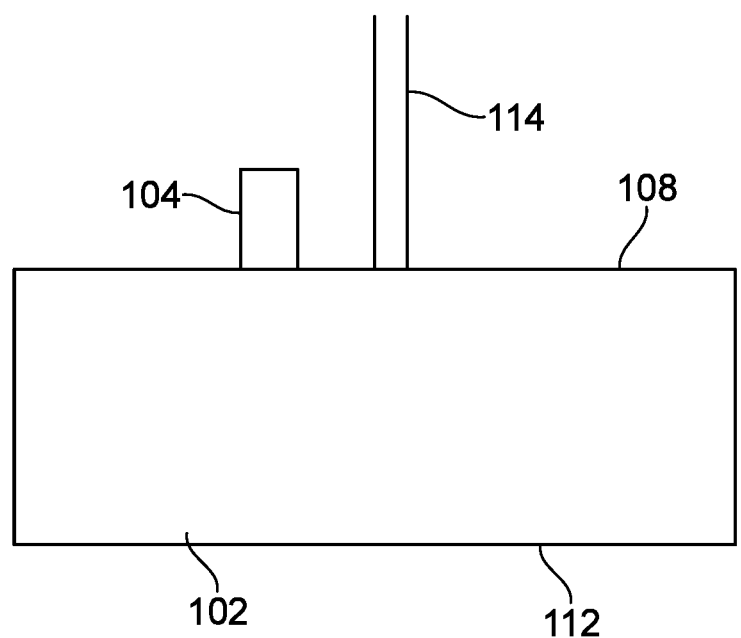
FIG. 2 illustrates a side view of a portion of the foundation and a single sensor mounted.

FIG. 2 illustrates a portion of the foundation 102 which may include a top surface 108 which may be opposed to a bottom surface 112 and which may be connected to a side surface 110. FIG. 2 additionally illustrates an elevation sensor 104 which may be mounted on the top surface 108 and illustrates a building wall 114 which may be an interior wall or an exterior wall.

Figure 3:
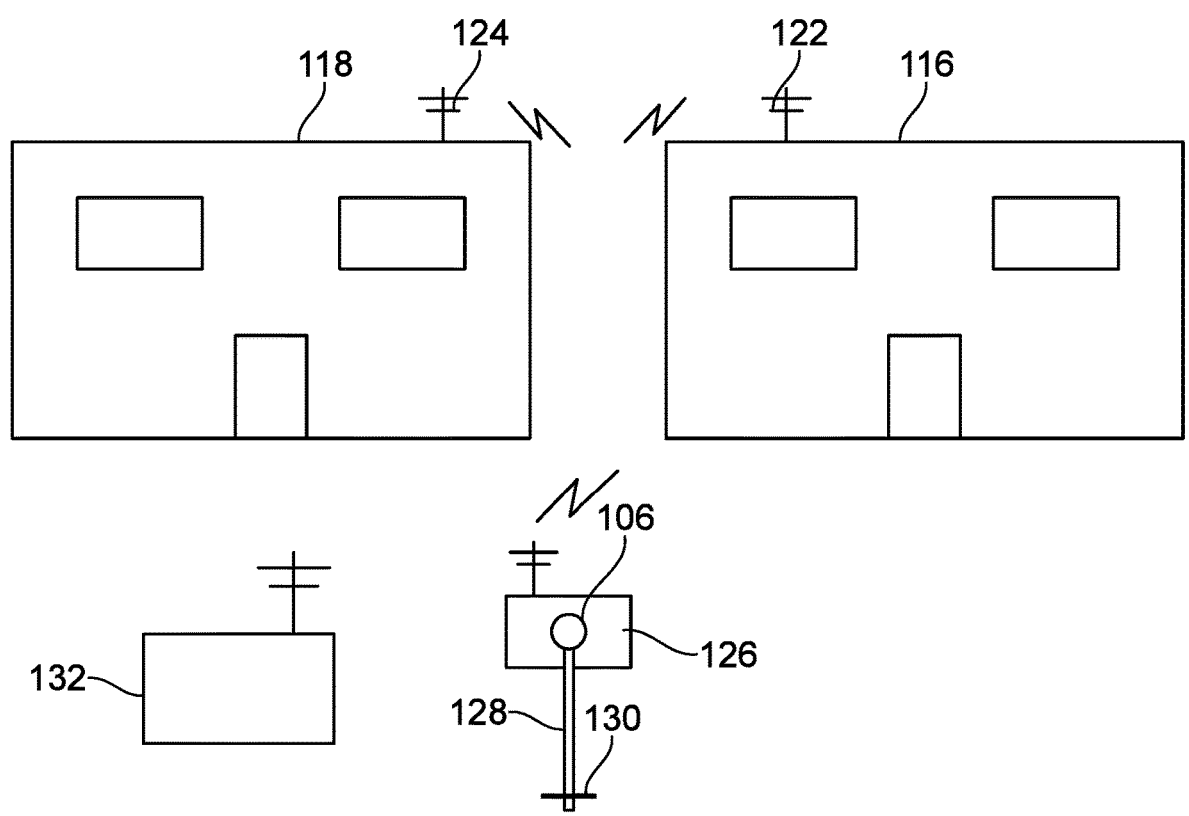
FIG. 3 illustrates a front view of the sensor system of the present invention.

FIG. 3 illustrates a first building 116, a second building 118 and the central transmitter/receiver 106 which may be positioned on a deep driven pier to provide a stable platform in the yard or on a nearby fixed static point to be used as a frame of reference and which may receive first signals 122 transmitted from the first elevation sensors 104 from the first building 116 and/or the second signals 124 transmitted from the second elevation sensors 104 from the second building 118 either simultaneously or non-simultaneously.

The transmitter/receiver 106 may be positioned in a housing 126 and may include shaft 128 to mount the housing 126 and may be mounted on a pier 130 which may extend into a substantially unmovable location such as bedrock.

Figure 4:
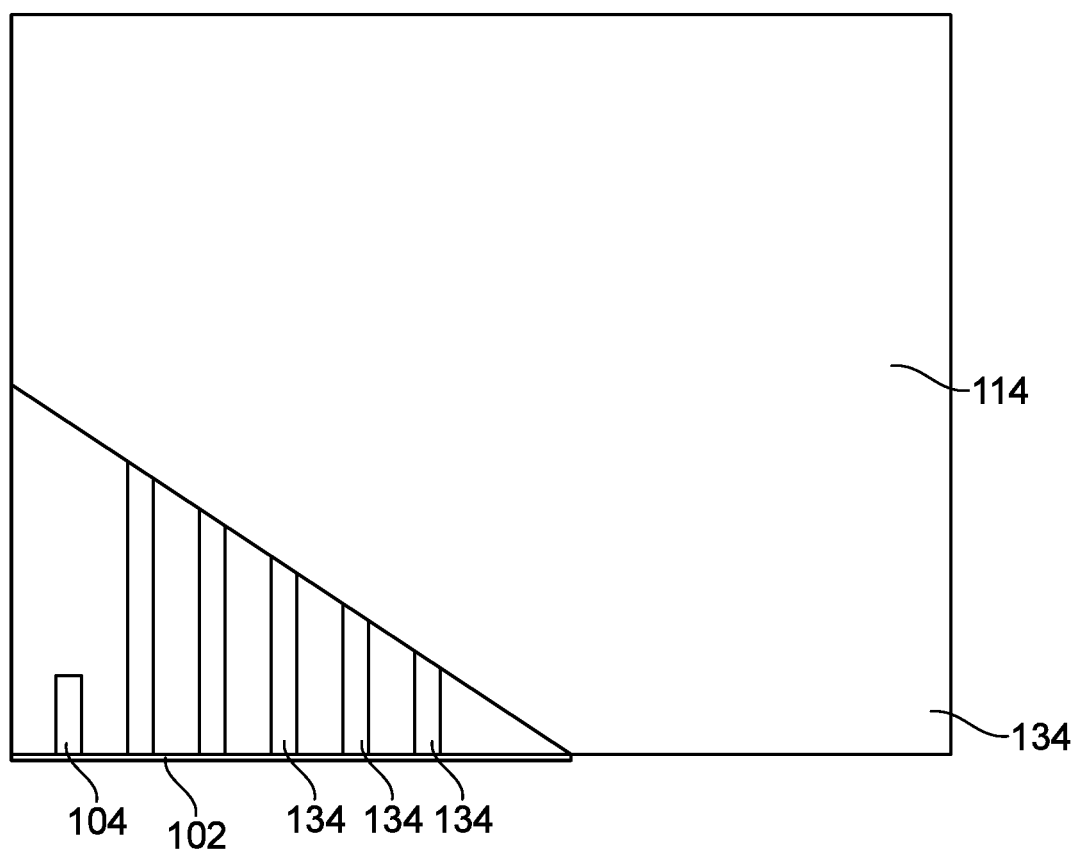
FIG. 4 illustrates a side view of an interior wall of the present invention.

FIG. 4 illustrates an exploded view of a building wall 114 which may be covered with an appropriate material such as wallboard 134 which may be attached to building studs 134 which in turn may be secured to the foundation 102. The elevation sensor 104 may be mounted on the foundation 102 in order to measure changes in the vertical height of the foundation 102.

Figure 5:
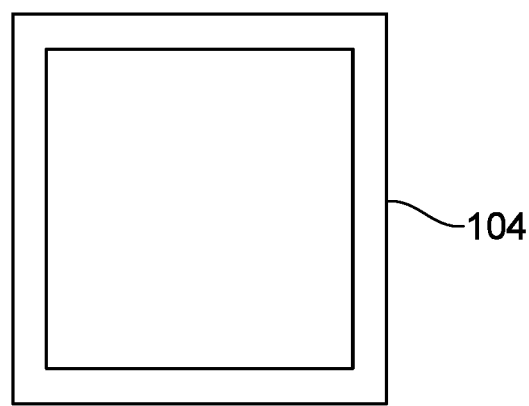
FIG. 5 illustrates a top view of a wireless sensor of the present invention.

FIG. 5 illustrates a top view of the elevation sensor 104 which is positioned independently of the foundation 102.

Figure 6:
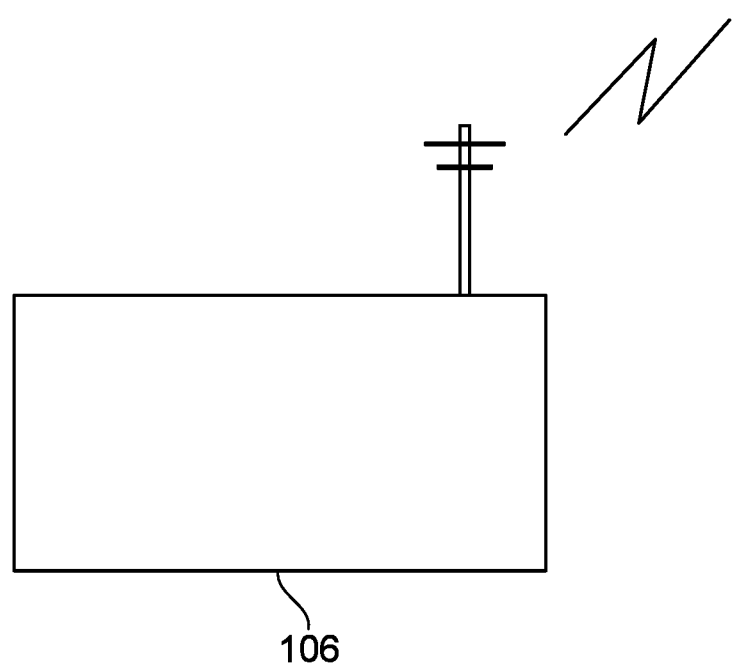
FIG. 6 illustrates a side view of the transmitter/receiver of the present invention.
Figure 7:
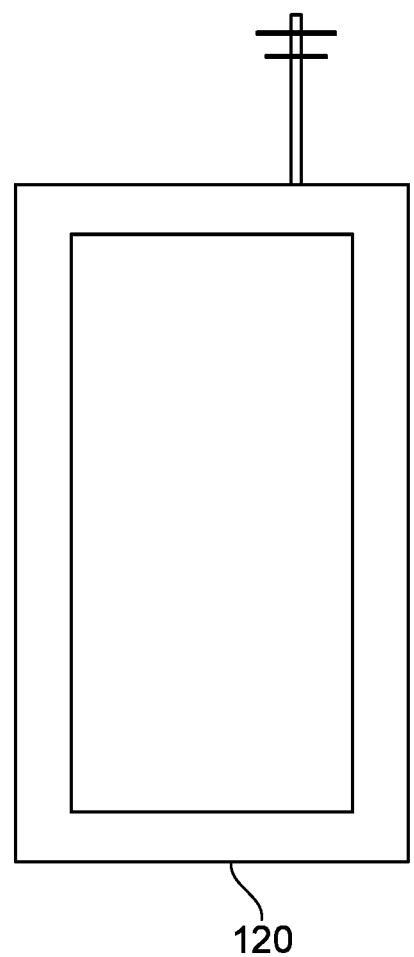
FIG. 7 illustrates a front view of a control device of the present invention

FIG. 6 illustrates a front view of the transmitter/receiver 106 which may be positioned on a deep driven pier to provide a stable platform in the yard or on a nearby fixed static point to be used as a frame of reference to receive signals from the elevation sensor 104 and to transmit signals to the central monitoring station 120 as shown in FIG. 7 which may be a handheld device such as a smart device, tablet or phone. The monitoring station 120 may transmit signals to the transmitter-receiver 106 to control the transmitter/receiver 106.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A system for monitoring the movement of a foundation, comprising:
   a receiver disposed on a platform off of the foundation, the platform stable relative to the foundation and comprising a frame of reference; and
   an elevation sensor disposed on the foundation and configured to broadcast to the receiver a first signal representing an elevation measurement of the elevation sensor,
   wherein the receiver is configured to generate, based on the first signal and the frame of reference, a second signal representing an elevation change of the elevation sensor, relative to the frame of reference.

2. The system of claim 1, wherein the receiver includes a transmitter to transmit the second signal to a central station.

3. The system of claim 2, wherein the central station is a handheld device.

4. The system of claim 3, wherein the handheld device is a smart phone.

5. The system of claim 3, wherein the handheld device is a tablet.

6. The system of claim 2, wherein the central station is wirelessly connected to the receiver.

7. The system of claim 1, wherein the receiver is wirelessly connected to the elevation sensor.

8. The system of claim 1, wherein the elevation sensor is directly mounted on the foundation.

9. The system of claim 1, wherein the elevation sensor is mounted at a corner of the foundation.

10. The system of claim 1, wherein the elevation sensor is mounted at a side of the foundation.

11. The system of claim 1, wherein the elevation sensor is mounted on an interior of the foundation.

12. A method comprising:
placing a receiver on a platform off of a foundation of a building, the platform stable relative to the foundation and comprising a frame of reference;
placing an elevation sensor on the foundation;
broadcasting, from the elevation sensor to the receiver, a first signal representing an elevation measurement of the elevation sensor; and
generating, by the receiver based on the first signal and the frame of reference, a second signal representing an elevation change of the elevation sensor, relative to the frame of reference.

13. The method of claim 12, further comprising:
transmitting the second signal to a central station.

14. The method of claim 13, further comprising:
correcting movement of the foundation using the second signal.

15. The method of claim 12, wherein placing the elevation sensor on the foundation comprises at least one of the group consisting of:
placing the elevation sensor directly on the foundation;
placing the elevation sensor within a wall of the building on the foundation;
placing the elevation sensor at a corner of the foundation;
placing the elevation sensor at a side of the foundation;
placing the elevation sensor on an interior of the foundation.

16. The method of claim 12, further comprising:
placing the platform outside of the foundation.

17. The method of claim 16, wherein placing the platform comprises driving a pier into bedrock.

18. A method comprising:
receiving, at a receiver, a first signal from an elevation sensor disposed on a foundation of a building,
wherein the receiver is disposed on a platform that comprises a stable frame of reference relative to the foundation,
wherein the first signal comprises an elevation measurement taken by the elevation sensor; and
determining, by the receiver using the first signal and the frame of reference, a change in elevation of the elevation sensor.

19. The method of claim 18, further comprising:
generating, by the receiver, a second signal comprising the change in elevation; and
transmitting the second signal to a central station.

20. The method of claim 19, further comprising:
correcting a movement of the foundation that corresponds to the change in elevation.

* * * * *